(12) United States Patent
Cabuk et al.

(10) Patent No.: US 8,060,934 B2
(45) Date of Patent: Nov. 15, 2011

(54) DYNAMIC TRUST MANAGEMENT

(75) Inventors: Serdar Cabuk, Bristol (GB); David Plaquin, Bristol (GB); Christopher Ian Dalton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 898 days.

(21) Appl. No.: 12/059,387

(22) Filed: Mar. 31, 2008

(65) Prior Publication Data

US 2009/0013406 A1  Jan. 8, 2009

(30) Foreign Application Priority Data

Apr. 13, 2007 (GB) .................................. 0707150.9
Aug. 10, 2007 (GB) .................................. 0715497.4

(51) Int. Cl.
*G06F 11/00* (2006.01)
*G06F 17/30* (2006.01)
(52) U.S. Cl. ............................. 726/22; 726/25; 726/26
(58) Field of Classification Search .................... 726/22, 726/25, 26
See application file for complete search history.

(56) References Cited

U.S. PATENT DOCUMENTS

| 6,061,740 | A | 5/2000 | Ferguson et al. |
| 2003/0196083 | A1 | 10/2003 | Grawrock et al. |
| 2005/0033987 | A1 | 2/2005 | Yan et al. |
| 2005/0132122 | A1 | 6/2005 | Rozas |

FOREIGN PATENT DOCUMENTS

| GB | 2375199 A | 11/2002 |
| GB | 2 424 494 | 9/2006 |
| WO | WO-2006/100522 | 9/2006 |

OTHER PUBLICATIONS

Trusted Computing Enabled Access Control for Virtual Organizations; Jing Zhan; Huanguo Zhang; Computational Intelligence and Security Workshops, 2007. CISW 2007. International Conference on; Publication Year: 2007 , pp. 490-493.*
A Dynamic Anonymous P2P Reputation System Based on Trusted Computing Technology Liming Hao; Shutang Yang; Songnian Lu; Gongliang Chen; Global Telecommunications Conference, 2007. GLOBECOM '07. IEEE Publication Year: 2007 , pp. 332-337.*
Trusted Computing Dynamic Attestation by Using Static Analysis Based Behavior Model; Yu, Fajiang; Tang, Xianglei; Yu, Yue; Li, Tong; Yang, Tong; Parallel and Distributed Processing with Applications Workshops (ISPAW), 2011 Ninth IEEE International Symposium on; Publication Year: 2011 , pp. 1-6.*
TPM Main Part 1 Design Principles, Specification Version 1.2, Level 2 Revision 103, Jul. 9, 2007, 182 pgs.
European Search Report, European Patent Office, European Patent Application No. 08153366.3, May 27, 2010.

* cited by examiner

*Primary Examiner* — David Y Jung

(57) ABSTRACT

A method and apparatus are provided for tracking the state of a software component in use on a computing platform. Upon a change of a first type in the software component (such as a change to an integrity-critical part of the component), an appropriate integrity metric of the software component is reliably measured and recorded in cumulative combination with any previous integrity metric values recorded for changes of the first type to the software component. Upon a change of a second type in the software component (such as a change to a non integrity-critical part of the component), an appropriate integrity metric of the software component is reliably measured and recorded as a replacement for any previous integrity metric value recorded for changes of the second type to the software component. The two resultant values provide an indication of the integrity state of the software component.

26 Claims, 7 Drawing Sheets

DYNAMIC TRUST MANAGEMENT

This application claims priority from Great Brian Patent Applications 0707150.9, filed on Apr. 13, 2007 and 0715497.4, filed on Aug. 10, 2007. The entire contents of the aforementioned applications are incorporated herein by reference.

FIELD OF THE INVENTION

The present invention relates to methods and apparatus for enabling dynamic trust management in computing platforms.

BACKGROUND OF THE INVENTION

Verifiable trust is a desirable property for computing systems—a user has a fundamental interest in knowing whether a computing platform about to be used (or in use) by the user will behave in a reliable and predictable manner, or will be (or already is) subject to subversion.

Existing trusted platforms typically contain a component at least logically protected from subversion; such platforms have been developed by the companies forming the Trusted Computing Group (TCG)—this body develops specifications in this area and the current TCG specifications are available at http://www.trustedcomputinggroup.org (see, in particular, the Trusted Platform Module Design Principles specification). The implicitly trusted components of a trusted platform (and, in particular, the Trusted Platform Module or 'TPM') enable integrity measurements of the platform to be reliably made and stored and subsequently reported as integrity metrics to users (including remote computing entities) wishing to interact with the platform. Such users are then able to determine from the consistency of the measured integrity metrics with known or expected values that the platform is operating as expected.

With the general trend of designing systems that maximize resource sharing (e.g., through virtualization technology), parties that consume these resources increasingly require a means of verifiable trust before deploying information-sensitive content on these systems. This issue is particularly critical for systems that host parties with potentially conflicting interests. A challenge in trust management is to manage trustworthiness in highly dynamic virtualized computer systems. This involves being able to monitor system integrity in an on-going fashion and to report changes in order to reflect the current system state. This is particularly crucial for systems in which system configuration and security policies frequently change and components are allowed to operate in various security modes. Current solutions usually deem such changes as malicious and, for example, require a system reset and restart to be able to re-establish trust. These solutions are either impractical or do not scale as the number of system components increase in a complex computer system.

The trust architecture set out in the TCG specifications mainly addresses the creation of a chain-of-trust in a static manner in which the relevant state of software components is measured once at the time it is loaded. These measurements are stored in so-called Platform Configuration Registers (PCR) of the TPM, and are incremental, that is, a sequence of measurements can be reported in the same PCR by incrementally extending the previous measurement without changing its size, thus enabling virtually infinite number of measurements. This way, the complete execution sequence can be recorded enabling a third-party to verify it at a later phase.

This static architecture imposes several limitations on complex dynamic systems in which system configuration and security policies are allowed to change frequently:

The TCG trust architecture does not efficiently handle the situation in which critical (i.e., measured) system components are allowed to change into another form (e.g., through a software update) or adapt to current conditions, or the situation in which system components may function in various operating modes (e.g., with different configurations) to perform operations with varying security needs. In either situation, the TCG specifications takes the conservative approach and deem any such change as potentially malicious and irreversible.

SUMMARY OF THE INVENTION

According to a first aspect of the present invention, there is provided a method of tracking the state of a software component in use on a computing platform, the method comprising:

upon a change of a first type in the software component, reliably measuring and recording an appropriate integrity metric of the software component in cumulative combination with any previous integrity metric values recorded for changes of said first type to the software component; and upon a change of a second type in the software component, reliably measuring and recording an appropriate integrity metric of the software component as a replacement for any previous integrity metric value recorded for changes of said second type to the software component.

According to a second aspect of the present invention, there is provided a computing platform including a monitoring arrangement for tracking the state of a software component in use on the computing platform, the monitoring arrangement comprising:

change responsive means for detecting and distinguishing first and second types of changes to the software component;

first and second memory registers;

first measuring means responsive to detection of a change of the first type in the software component, to reliably measure an appropriate integrity metric of the software component;

first recording means for recording the integrity metric measured by the first measuring means in the first register in cumulative combination with any previous integrity metric values recorded in the first register for changes of said first type to the software component;

second measuring means responsive to detection of a change of the second type in the software component, to reliably measure an appropriate integrity metric of the software component;

second recording means for recording the integrity metric measured by the second measuring means in the second register as a replacement for any previous integrity metric values recorded in the second register for changes of said second type to the software component.

BRIEF DESCRIPTION OF THE DRAWINGS

Embodiments of the invention will now be described, by way of non-limiting example, with reference to the accompanying diagrammatic drawings of the prior art and of embodiments of the invention, in which.

DETAILED DESCRIPTION OF EMBODIMENTS OF THE INVENTION

Figure 1:
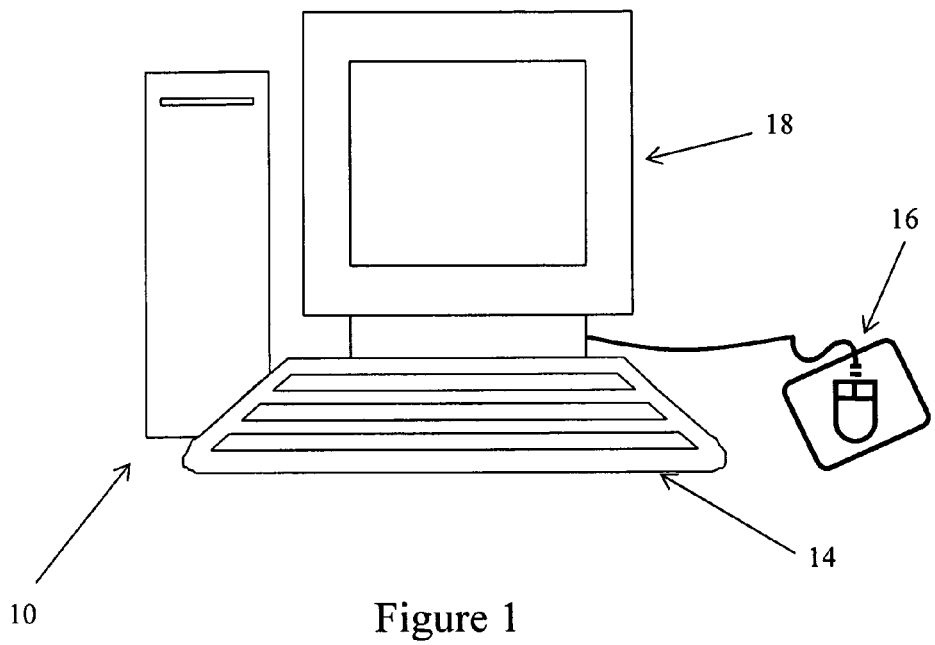
FIG. 1 is an illustration of an exemplary prior-art computer platform.

Before describing embodiments of the present invention, two prior-art trusted computing platforms will be described with reference to FIGS. 1 to 6 to introduce certain terms and concepts later used in describing the embodiments of the invention. The specifics of the described prior-art trusted computing platforms (starting with the next paragraph) are not intended to limit the scope of the present invention unless otherwise stated. As used herein, the term "computing platform" is to be understood as encompassing any apparatus capable of effecting computation and is not limited to computers; for example, digital cellular equipment (including mobile telephones) have substantial computing capability and are within the scope of the term "computing platform". Furthermore, in the present context "trust" is the expectation that a device will behave in a particular manner for a specific purpose, and a "user" can be a local user or a remote user such as a remote computing entity.

General Characteristics of a Prior-Art Trusted Platform

A trusted computing platform provides for trustable platform integrity measurement and reporting. and to this end has a plurality of shielded locations, that is, places (memory, registers, etc.) where it is safe to operate on sensitive data. Integrity measurement is the process of obtaining integrity metric measurements of a platform (that is, measurements of platform characteristics that affect the integrity—trustworthiness—of the platform) and putting the measurements (here taken to encompass derivative values such as digests) into shielded locations; in TCG parlance, the shielded locations used for storing integrity metrics are referred to as Platform Configuration Registers or "PCRs" and this terminology will be used hereinafter. The values held in the PCRs are reportable integrity metric values. Integrity reporting is the process of attesting to integrity metrics recorded in PCRs in a way that associates the metrics with the platform concerned. A trusted computing platform may also provide, in addition to shielded locations, trustable storage for securely storing data in encrypted form and for ensuring that access to this data only occurs in a named environment. The foregoing trusted features will normally involve the use of cryptographic functions.

A user can verify the correct operation of a trusted computing platform, for example, before exchanging data with the platform, by requesting the trusted platform to provide one or more integrity metrics. The user receives the integrity metric or metrics, and compares them against values which it believes to be true (these values being provided by a trusted party, TP that is prepared to vouch for the trustworthiness of the platform or by another party the user is willing to trust). If there is a match, the implication is that at least part of the platform is operating correctly, depending on the scope of the integrity metric. If there is no match, the assumption is that the entire platform has been subverted and cannot be trusted (unless isolation technologies are employed to restrict the scope of what cannot be trusted).

Once a user has established trusted operation of the platform, he exchanges data with the platform. For a local user, the exchange might be by interacting with some software application running on the platform. For a remote user, the exchange might involve a secure transaction. In either case, the data exchanged is preferably 'signed' by the trusted platform. The user can then have greater confidence that data is being exchanged with a platform whose behaviour can be trusted. Data exchanged may be information relating to some or all of the software running on the computer platform.

Trusted Entity Providing for Roots of Trust

In order to impart to a computing platform the characteristics of a trusted computing platform, it is necessary to provide the platform with certain inherently trustable functionalities (collectively making up what is herein referred to as a "trusted entity") which are is physically or logically bound to the platform and operate, together with elements of the computing platform, to provide the desired trusted characteristics (minimally, integrity measurement and reporting). In effect, the trusted entity provides the platform with 'roots of trust' and an example of this is given below.

For trusted platforms following the TCG Specifications, the trusted entity is called a Trusted Platform Module ("TPM") and serves to provide, together with elements of the computing platform to which the trusted entity is bound, the following "roots of trust":

: A root of trust for measurement (RTM),—the RTM is a computing engine capable of making inherently reliable integrity measurements and is typically the normal platform computing engine (main processor) controlled by the so-called core root of trust for measurement (CRTM), that is the instructions executed by the platform when it acts as the RTM. The CRTM is logically part of the aforesaid trusted entity and would ideally be included in the TPM but for cost reasons is usually implemented by a separate ROM.

A root of trust for storage (RTS)—the RTS is a computing engine capable of maintaining an accurate summary in PCRs of values of integrity measurement digests; the RTS may also provide for 'protected storage' serving to protect data (frequently keys) held in external storage devices as opaque "blobs" and 'sealed'/'unsealed' for access by the RTS against a particular environment (as indicated by PCR values).

A root of trust for reporting (RTR)—the RTR is a computing engine responsible for establishing platform identities, reporting platform configurations (PCR values), protecting reported values and establishing a context for attesting to reported values. The RTR shares responsibility of protecting measurement digests with the RTS.

It may be noted that, as indicated above, the elements forming the RTM are typically (though not necessarily) outside a TPM; in contrast, the RTS and RTR are normally provided by the TPM itself.

Generally, any trusted platform will provide such roots of trust (though possibly in a different conceptual arrangement).

A trusted entity can be embodied as a hardware device (which may include a program-controlled processor) or in software for execution by a main processor of the platform (in which case it is usually referred to as a 'virtual' trusted entity/device or in the case of a TPM, a virtual TPM). In practice, virtual trusted entities are normally provided on platforms that have a basic hardware trusted entity for the basic platform environment but which employ further trusted entities for virtual environments created on the platform.

It is, of course, also possible to implement a trusted entity as a combination of a hardware device and software intended for execution on the platform processor; this is suitable, for example, for the software implementation of higher-level features of the trusted entity (non core features) where the trustworthiness of the software can be established by a chain of trust rooted in the RTM.

The functionality of the trusted entity can be distributed between multiple devices (in the case of a hardware embodiment) or code blocks (in the case of a 'virtual' embodiment).

The trusted entity uses cryptographic processes but does not necessarily provide an external interface to those cryptographic processes. The trusted entity should be logically protected from other entities—including other parts of the platform of which it is itself a part. Also, most desirable implementations provide the trusted entity with protective features to protect secrets stored by or being processed by the trusted entity by making them inaccessible to other platform functions, and provide an environment that is substantially immune to unauthorised modification For a hardware embodiment, the trusted entity, therefore, preferably consists of one physical component that is tamper-resistant. Techniques relevant to tamper-resistance are well known to those skilled in the art of security. These techniques include methods for resisting tampering (such as appropriate encapsulation of the trusted entity), methods for detecting tampering (such as detection of out of specification voltages, X-rays, or loss of physical integrity in the trusted entity casing), and methods for eliminating data when tampering is detected. As regards a 'virtual' trusted entity, although software may not afford such a high degree of tamper-resistance as a hardware device, this may be compensated for by additional protection measures. For example, the software code may include self-test functions, to check the integrity of the trusted functionality. Other measures would be known for protecting software-based implementations.

Chain of Trust

The trustable integrity measurement and reporting enabled by the presence of the trusted entity in the platform typically enables trust to be placed in other platform components or functions which in turn perform trustable integrity measurement of further platform components or functions and so on. This process of extending the boundary of what is trustable is called "transitive trust" and can be thought of as establishing a chain of trust rooted in the platform's roots of trust. Thus in a typical example:

the trusted code for effecting an initial integrity measurement (the CRTM in TCG parlance) serves to measure an integrity metric of OS loader code to enable trust to be placed in this code (if the metric match the expected value);

the OS loader code in turn determines an integrity metric for Operating System code to enable trust to be placed in the operating system;

the operating system in turn determines an integrity metric for application code to enable trust to be placed in the application.

FIRST EXAMPLE

Prior-Art Trusted Platform

Overview

An example trusted platform 10 is illustrated in the diagram in FIG. 1. The computing platform 10 is shown as a so-called personal computer and is entirely conventional in appearance—it has associated the standard features of a keyboard 14, mouse 16 and visual display unit (VDU) 18, which provide the physical 'user interface' of the platform. The computing platform 10 is arranged to run a standard operating system such as Microsoft™ Windows XP™.

Figure 2:
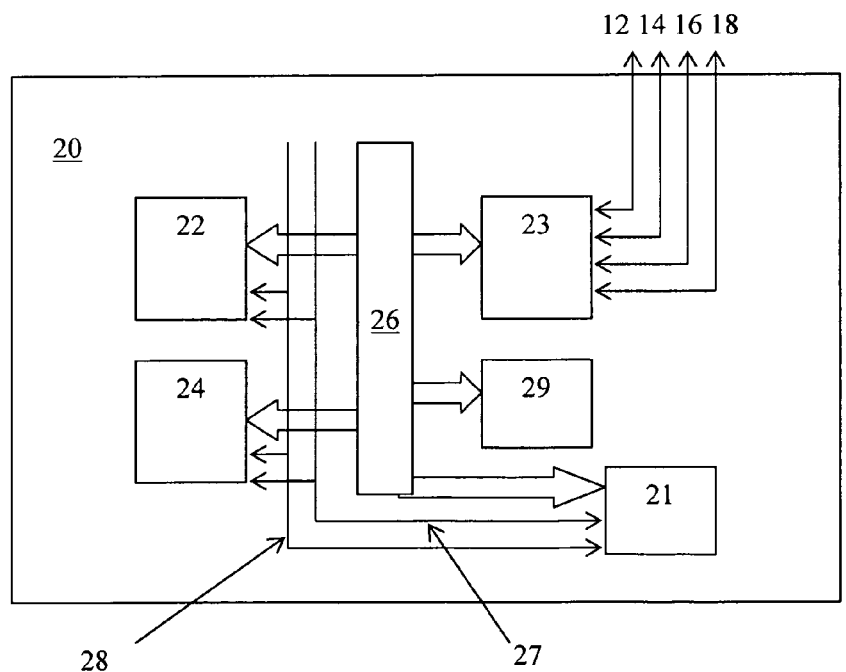
FIG. 2 indicates functional elements present on the motherboard of a prior-art trusted computer platform.

As illustrated in FIG. 2, the motherboard 20 of the trusted computing platform 10 includes (among other standard components) a main processor 21, main memory 22, a trusted entity here embodied in the form of trusted device 24 (such as a hardware TPM), a data bus 26 and respective control lines 27 and address lines 28, BIOS memory 29 containing the BIOS program for the platform 10, an Input/Output (IO) device 23, which controls interaction between the components of the motherboard and the keyboard 14, the mouse 16 and the VDU 18, and an I/O device 25, for example an Ethernet controller, for controlling communications with remote devices or systems. The main system memory 22 is typically random access memory (RAM). In operation, the platform 10 loads the operating system, in this case Windows XP™, into RAM from hard disk (not shown). Additionally, in operation, the platform 10 loads the processes or applications that may be executed by the platform 10 into RAM from hard disk (not shown). The mounting of the trusted device 24 on the mother board serves to bind it to the platform.

Typically, in a personal computer, the BIOS program is located in a special reserved memory area, such as the upper 64K of the first megabyte of the system memory (addresses F000h to FFFFh), and the main processor is arranged to look at this memory location first, in accordance with an industry wide standard. A significant difference between the trusted platform under discussion and a conventional platform is that, after reset, the main processor is initially controlled by CRTM code (which in the present example comprise hash function code stored in the trusted device 24) which then hands control over to the platform-specific BIOS program, which in turn initialises all input/output devices as normal. After the BIOS program has executed, control is handed over as normal by the BIOS program to an operating system program, such as Windows XP™, which is typically loaded into main memory 22 from a hard disk drive (not shown).

The main processor 21 is initially controlled by the CRTM code because it is necessary to place trust in the first measurement to be carried out on the trusted platform. The CRTM code is typically trusted at least in part because its provenance. As already indicated, the main processor 21 when under control of the CRTM forms the "root of trust for measurement" RTM. As is typical, one role of the RTM in the present case is to measure other measuring agents before these measuring agents are used and their measurements relied upon. The RTM is the basis for the aforementioned 'chain of trust'. Note that the RTM and subsequent measurement agents do not need to verify subsequent measurement agents; they merely measure and record them before they execute. This is called an "authenticated boot process". Valid measurement agents may be recognised by comparing a digest of a measurement agent against a list of digests of valid measurement agents. Unlisted measurement agents will not be recognised, and measurements made by them and subsequent measurement agents are deemed to be suspect.

Example Trusted Device

Further details will now be given of an implementation of the trusted device 24, it being understood that corresponding functionality can be provided in a software trusted entity (that is, virtual trusted device).

Figure 3:
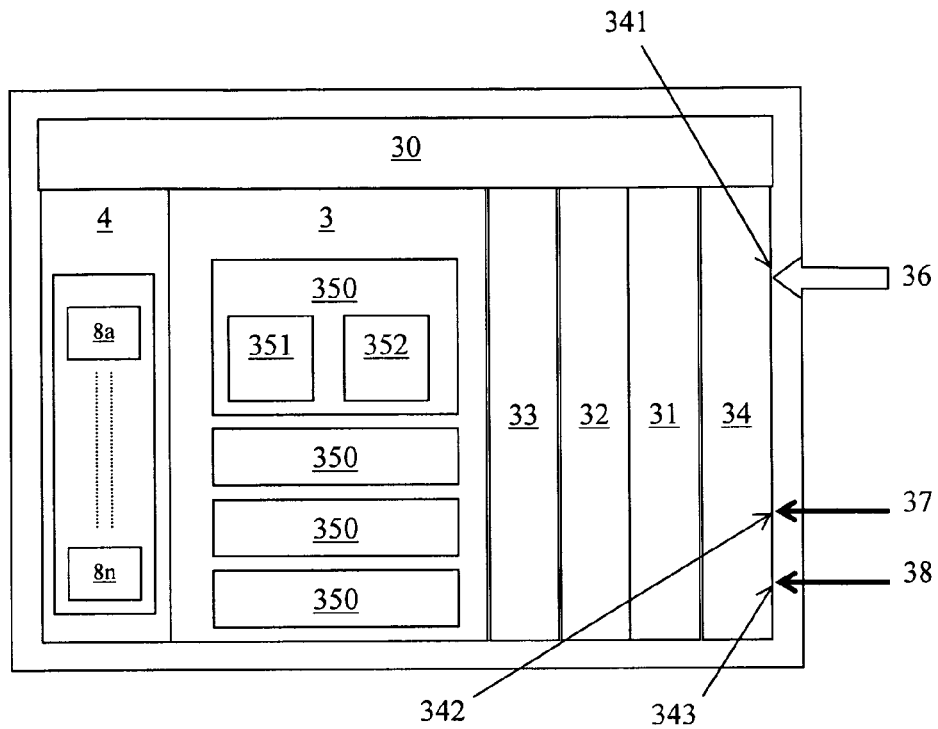
FIG. 3 indicates the functional elements of a prior-art trusted device of the trusted computer platform of FIG. 2.
Figure 4:
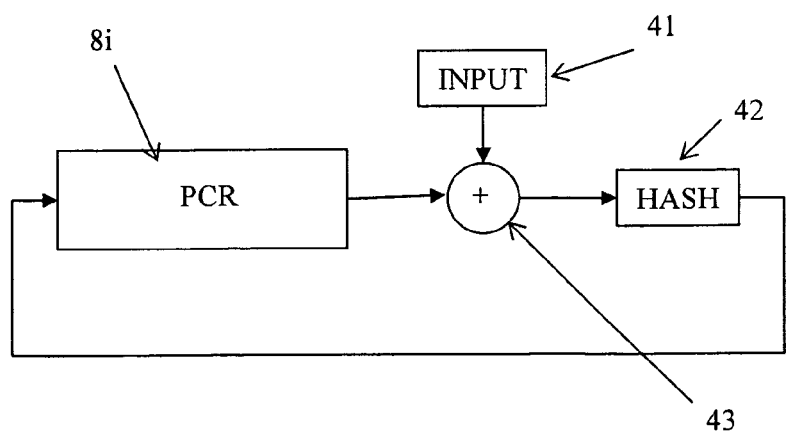
FIG. 4 illustrates the known prior-art process of extending values into a platform configuration register of the trusted device of FIG. 2.

The trusted device 24 comprises a number of blocks, as illustrated in FIG. 3. As already indicated, after system reset the trusted device 24 participates in an authenticated boot process to ensure that the operating state of the platform 10 is recorded in a secure manner. During the authenticated boot process, the trusted device 24 acquires at least one integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface. In a particularly preferred arrangement, the display driver for the computing platform is located within the trusted device 24 with the result that a local user can trust the display of data provided by the trusted device 24 to the display.

Specifically, the trusted device 24 in this embodiment comprises: a controller 30 programmed to control the overall operation of the trusted device 24, and interact with the other functions on the trusted device 24 and with the other devices on the motherboard 20; a measurement function 31 for acquiring a first integrity metric from the platform 10 either via direct measurement or alternatively indirectly via executable instructions to be executed on the platform's main processor; a cryptographic function 32 for signing, encrypting/decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. As has already been described, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data that is preferably stored in the non-volatile memory 3 of the trusted device 24 is a certificate 350. The certificate 350 contains at least a public key 351 of the trusted device 24 and an authenticated value 352 of the platform integrity metric measured by a trusted party (TP). The certificate 350 is signed by the TP using the TP's private key prior to it being stored in the trusted device 24. In later communications sessions, a user of the platform 10 can deduce that the public key belongs to a trusted device by verifying the TP's signature on the certificate. Also, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labeling of data relevant to the trusted device 24, but is insufficient in itself to prove the identity of the platform 10 under trusted conditions.

As already indicated, the trusted device 24 cooperates with other elements of the platform 10 to reliably acquire at least one integrity metric of the platform. In the present embodiment, a first integrity metric is acquired by having the main platform processor execute the CRTM code that is stored in the trusted device 24; the CRTM when executed by the platform processor generates a digest of the BIOS instructions in the BIOS memory and passes it to the measurement function for storage. Such an acquired integrity metric, if verified as described above, gives a potential user of the platform 10 a high level of confidence that the platform 10 has not been subverted at a hardware, or BIOS program, level.

It would alternatively be possible to provide a measurement engine within the trusted device and have this engine form an integrity measurement on the BIOS code on platform start up (reset).

In the present example, the measurement function 31 has access to: non-volatile memory 3 for storing the CRTM hash code 354 and a private key 355 of the trusted device 24, and volatile memory 4 for storing acquired integrity metric measurements. The trusted device 24 has limited memory, yet it may be desirable to store information relating to a large number of integrity metric measurements. This is done in trusted computing platforms as described by the Trusted Computing Group by the use of Platform Configuration Registers (PCRs) 8a-8n. The trusted device 24 has a number of PCRs of fixed size (the same size as a standard measurement digest)—on initialisation of the platform, these are set to a fixed initial value. Integrity measurements are then "extended" into PCRs by a process shown in FIG. 4. The PCR 8i value is concatenated 43 with the input 41 which is the value of the integrity measurement to be extended into the PCR. The concatenation is then hashed 42 to form a new 160 bit value. This hash is fed back into the PCR to form the new value of the integrity metric concerned. In addition to the extension of the integrity measurement into the PCR, to provide a clear history of measurements carried out the measurement process may also be recorded in a conventional log file (which may be simply in main memory of the computer platform). For trust purposes, however, it is the PCR value that will be relied on and not the software log.

Clearly, there are a number of different ways in which an initial integrity metric value may be calculated, depending upon the scope of the trust required. The measurement of the BIOS program's integrity provides a fundamental check on the integrity of a platform's underlying processing environment. The integrity metric measurement should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

It may also be noted that, preferably, the BIOS boot process includes mechanisms to verify the integrity of the boot process itself. Such mechanisms are already known from, for example, Intel's draft "Wired for Management baseline specification v 2.0—BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked. Optionally, after receiving the computed BIOS digest, the trusted device 24 may inspect the proper value of the BIOS digest in the certificate and not pass control to the BIOS if the computed digest does not match the proper value—an appropriate exception handling routine may be invoked.

Once the BIOS code has been measured (and, preferably, verified) and then loaded, the BIOS preferably measures the next software component (such as OS loader) and causes a corresponding integrity metric measurement to be stored in the trusted device 24 before loading that software; in this way, a chain of trust can be built up to include the operating system and applications loaded by it, with corresponding integrity metrics being stored in the PCRs of the trusted device 24.

Other integrity checks may be carried out involving the measuring of program code and storing of a corresponding integrity metric measurement in the trusted device; for example, the CRTM or BIOS could be arranged to measure the BIOS programs associated with a SCSI controller to enable communications with peripheral equipment to be trusted. Other forms of integrity check may also be effected, for example memory devices or co-processors, on the platform could be verified by enacting fixed challenge/response interactions to ensure consistent results; these checks can also give rise to integrity metrics stored in the PCRs of the trusted device 24.

As will be clear from the foregoing, a large number of integrity measurement may be collected by measuring agents directly or indirectly measured by the RTM, and these integrity measurement extended into the PCRs of the trusted device 24. Some-many-of these integrity measurement will relate to the software state of the trusted platform. How the PCRs are allocated is preferably standardized for each platform type. By way of example, according to the TCG Specification for PC Clients, the PCRs are divided into two primary sets: the first set is designated for the platform's pre-OS environment (PCR[0-7]) and the other designated for the platform's OS (PCR[8-15]). In this case, the pre-OS PCRs provide the platform's initial chain of trust starting from platform reset; in other words, they establish a chain of trust from the CRTM through the OS's IPL (Initial Program Load) Code.

Changes to a software component after its initial measurement and loading result in the software component being re-measured and the resulting integrity measurement being passed to the trusted device to extend the PCR associated with that component.

As already indicated, when a user wishes to communicate with the platform, he uses a challenge/response routine to challenge the trusted device 24 (the operating system of the platform, or an appropriate software application, is arranged to recognise the challenge and pass it to the trusted device 24, typically via a BIOS-type call, in an appropriate fashion). The trusted device 24 receives the challenge and creates an appropriate response based on the measured integrity metric or metrics—this may be provided with the certificate(s) giving expected integrity-metric value(s) and signed. This provides sufficient information to allow verification by the user.

Protected Storage—Sealing/Unsealing Data

As indicated above, a trusted entity such as the trusted device 24 may include trusted functionality (RTS) that provides a 'protected storage' mechanism for sealing data (typically keys or passwords) into an opaque blob held outside the trusted entity, the blob being subsequently accessible only when the platform is in a particular (trusted) state. This state is specified at the time of sealing by a digest of the values of some or all the PCRs. To unseal the data blob, the same digest must be formed from the current values of the PCRs. If the new digest is not the same as the digest in the opaque blob, then the user cannot recover the data.

Figure 5:
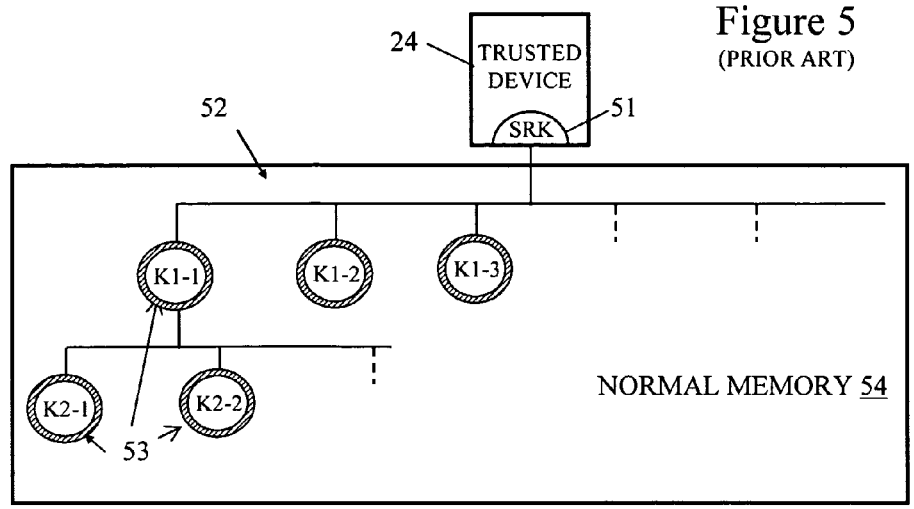
FIG. 5 is a diagram of a key hierarchy associated with the trusted device of FIG. 4.

One approach to implementing protected storage in the trusted device 24 will now be described, this approach being that used in TPMs. As illustrated in FIG. 5, in this approach, protected storage is implemented as a hierarchy (tree) 52 of data objects the root of which is a Storage Root Key (SRK) 51 that is permanently stored in the trusted device 24 (and not released from it). Apart from the SRK, the tree 52 can be stored outside of the trusted device in normal memory 54. When information in a node is used or revealed, the node is manipulated by the trusted device. Each intermediate node object in the tree is encrypted by a key in the node object above it in the tree (the parent node), all the way back to the SRK root node; in FIG. 5 two levels are shown below the SRK, namely a first level storing keys K1-1 to K1-3 and a second level storing keys K2-1 and K2-2, the encrypted nature of each key being indicated by the surrounding hatched annulus). Each key has an associated authorisation value that an entity wishing to make use of the key must present to the trusted device 24 (or, more accurately, used in a protocol that proves knowledge of the value without revealing the value) before the trusted device permits the key to be used. Intermediate nodes in the tree will always be keys but leaf nodes can be arbitrary data (though frequently they will also be keys, such as symmetric keys for use by application processes in protecting bulk data). Keys in the tree can either be "non-migratable" meaning that the private key is only known to the trusted device, or "migratable" meaning that there is no guarantee about the origin and use of the private key.

SECOND EXAMPLE

Prior-Art Trusted Platform

Assuming that integrity metrics are recorded for the operating system and applications loaded by the operating system, the above-described trusted platform 10 enables a user to check the state of the platform and decide whether or not to trust it. If the operating system has run an application that is not trusted by a first user (though possibly trusted by a different user), the first user can detect this (even after the application has terminated) by checking the relevant PCRs. However, in this case, for the above-described trusted platform, the only way for trust in the platform to be re-established for the first user is for the platform to be re-started. This drawback is multiplied where the platform is used to run a compartmented operating system supporting multiple computing environments since, unless appropriate measures are in place, running an un-trusted application in any of the environments requires the platform to be re-started to re-establish trust.

A solution to this is to provide a hardware/software architecture that enables the core software (BIOS & operating system/hypervisor) to be isolated from higher-level software so that if the latter is not trusted, it is only necessary to rebuild trust from the core software (assuming the latter is trusted). Where the core software supports multiple computing environments, then provided the latter are isolated from each other, an untrusted environment can be restarted without restarting the core software or the other computing environments supported by it. Furthermore, where multiple computing environments are supported, it is convenient to provide a respective trusted entity (typically a virtual trusted device) for each such environment.

An example trusted platform 60 supporting multiple isolated computing environments will now be briefly described with reference to FIG. 6. A fuller description of a trusted platform of this type can be found in US published patent application US 2003/0226031.

Figure 6:
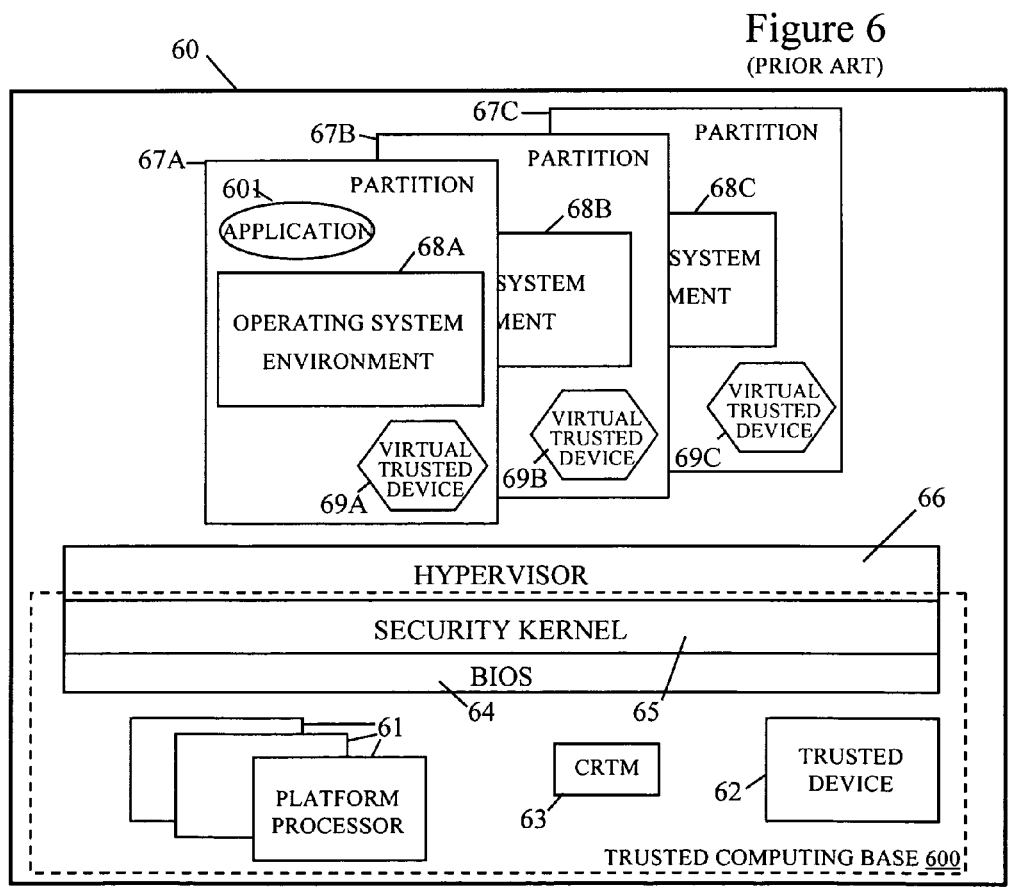
FIG. 6 is a diagram of a further prior-art computing platform running a hypervisor and providing for multiple isolated operating system environments.

The trusted platform 60 shown in FIG. 6 has one or more platform processors 61 and a hardware trusted device 62 similar to the previously described trusted device 24 but with the code forming the CRTM being in a separate ROM 63. In equivalent manner to that described above for the platform 10 and trusted device 24, following a platform reset, the CRTM code is run by one of the main platform processor 61 to determine an integrity metric for the BIOS code (stored for example in the same ROM 63 as the CRTM) and pass the metric to the trusted device 62 for insertion into a PCR. Thereafter, the BIOS is loaded 64 which in turn measures and records in trusted device 62 an integrity metric of security kernel code before loading the security kernel 65; the security kernel 65 then measures and records in trusted device 62 an integrity metric of hypervisor code before loading the hypervisor 66 (also called a virtual machine monitor). In practice, there will typically be more integrity metrics recorded and intermediate code modules loaded. The BIOS 64 and the security kernel 65 are run at the most privileged level of the main platform processor 61 while the hypervisor 66 is run at the second most privileged level of the main platform processor 61. All other code is run at a lower privilege level thus providing isolation of the BIOS and the hypervisor/security kernel 65 from potentially untrustworthy code. The elements 61 to 65 form the trusted computing base 600 of the platform 60. The hypervisor 66 may also be considered part of the trusted computing base with the proviso that for any complex program such as hypervisor 66, while it is possible to verify that the hypervisor code on the platform is identical to a reference version, it is very difficult to be sure that the reference version itself does not possess any security weaknesses.

The hypervisor 66 enables a plurality of operating system environments to be provided each in its own partition isolated from the other operating system environments; in FIG. 6, by way of example, three operating system environments 68A, 68B and 68C are shown, each in its own respective partition 67A, 67B, 67C; each partition may be arranged to execute on a different platform processor 61, thereby improving the degree of isolation. The hypervisor 66 enables and protects communications between the partitions and with the outside world. Applications are run as required in an appropriate one of operating system environments; in the present case one application 601 is shown running in operating system environment 68A. Applications typically run at the lowest privilege level, below that of the operating system environments.

In the present example, each partition 67A, 67B, 67C has its own associated virtual trusted device 69A, 69B, 69C (although shown in FIG. 6 in each partition, the virtual trusted devices are logically part of the security kernel and run at the same privilege level or in a separate partition.). The virtual trusted device of a partition is used to measure and record integrity metrics for the related operating system environment and any applications it is running.

It will be appreciated that the isolation provided by the platform 60, minimizes the software that must be re-started to re-establish trust in any particular partition. It will also be appreciated that the arrangement of having one hardware trusted device 62 and one virtual trusted device per partition is merely one possibility among many, including just having a single hardware or virtual trusted device for all the platform.

Embodiments of the Invention

In the above-described prior art trusted device 24, integrity measurements concerning a particular software component or collection of components are stored in a particular PCR by cumulative combination with values previously stored to the same PCR since its last reset.

This ensures that a measurement indicating untrustworthy software will impact all subsequent values of the PCR enabling the fact that untrustworthy software has been loaded to be kept visible (even after the software concerned has been unloaded). This arrangement does not, however, efficiently handle the situation in which software components are allowed to change into another form (e.g., through a software update) or adapt to current conditions, or the situation in which system components may change between various operating modes (e.g., with different configurations) to perform operations with varying security needs. In either situation, the software component is likely to move from a trusted state to a state that is not trusted according to the value of its related PCR as updated following the change, even though the change may not affect the security of the component. The TCG specifications takes the conservative approach and deem any such change as potentially malicious and irreversible so that to re-establish trust it is necessary either to restart the platform (for a platform operating without privilege levels) or the partition concerned (for a platform such as described above with reference to FIG. 6).

In the following description of embodiments of the invention, changes to which a software component may be subject are divided into first and second types; the categorization of a change as first or second type is component dependent, being set in a 'change-type' policy associated with the component, but as a rule of thumb:

a change of the first type is one that requires the component to be restarted to re-establish its integrity; such a change is one made to the integrity critical part of the component, that is, to the code or other data of the component that has a potential impact on the ability of the component to implement its intended functionality correctly— for convenience such a change is referred below to as an "critical" change. An example of a critical change might be a kernel loading a new driver in its memory or an application loading a plug-in in its memory in a way that will affect its behaviour.

a change of the second type is a change that is not of the first type; such a change is one made to a non integrity-critical part of the component, that is to code or other data of the component that has no impact on the component's ability to implement its intended functionality—a change of the second type is referred to below as a "non-critical" change. A particular example of a non-critical change might be a configuration or mode change.

A software component for which such a classification of changes is made and used in determining the integrity of the component is referred to below as a "dynamic" component (because, as will be seen its trustworthiness may change any number of times)

First Embodiment

Figure 7:
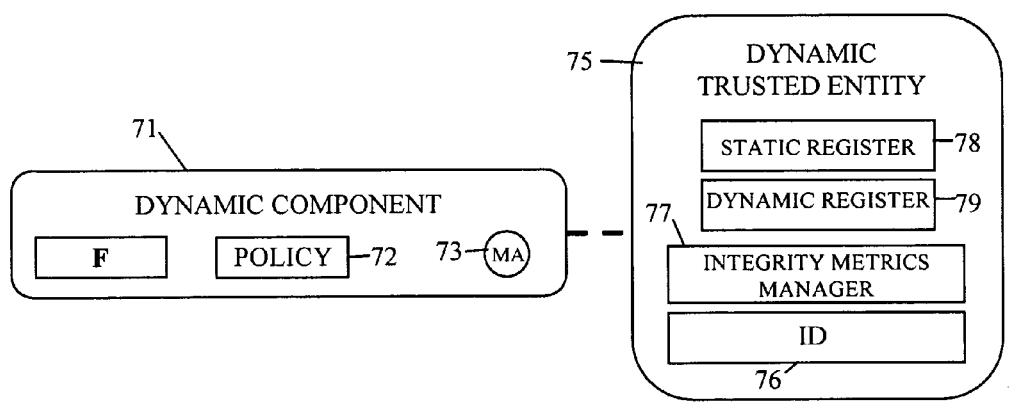
FIG. 7 is a diagram of a first embodiment of the invention showing a dynamic component and an associated dynamic trusted entity.

A first embodiment of the invention will now be described with reference to FIGS. 7 and 8. According to this embodiment, when a dynamic component 71 is created, a special type of trusted entity 75 is associated with it on a one-to-one basis (this special type of trusted entity is hereinafter called a "dynamic trusted entity"—or 'DTE'—to indicate that it is related to a dynamic component).

The dynamic component 71 comprises, in addition to code providing the component's intended normal functionality F, a change-type policy element 72 for use in determining whether a change to the component is a trust-irrecoverable or trust recoverable change, and measurement agent(s) 73 for measuring changes to the component itself. An appropriate mechanism is provided for enabling the dynamic component to communicate with its associated DTE 75. Both the change-type policy 72 and the measuring agent 73, although shown as part of the dynamic component 71, can be separately disposed while remaining associated with the component 71.

As already indicated, the DTE 75 is a special type of trusted entity and will almost always be implemented as a virtual trusted entity running in a secure environment (for example, by running at an appropriate privilege level or in a separate partition). As indicated by box 76 in FIG. 7, the DTE 75 has a persistent identity. The DTE 75 comprises both a static register 78 and a dynamic register 79 for holding integrity measurements made on the dynamic component 71; by 'register' is simply meant a memory location. An integrity measurement stored to the static register 78 is combined with the existing value held in the register, that is, the register value is extended (for example, in a manner similar to the way a prior-art PCR is extended); in contrast, an integrity measurement stored to the dynamic register 79 simply replaces the previous value held in that register. The DTE 75 further comprises an integrity metrics manager 77 providing functionality for storing integrity measurements in the register 78, 79 and reliably reporting the register values. The DTE 75 may also hold the expected measurement values for the component 71.

When the dynamic component 71 is created, the creating entity acquires an integrity metric of at least those parts (code and other data) of the dynamic component 71 that have a potential impact on the ability of the dynamic component to implement its intended functionality correctly, and puts the value of this metric into the static register 78 of the DTE 75; the creating entity may also acquire an integrity metric of at least those parts (code and other data) of the dynamic component that have no impact on the component's ability to implement its intended functionality, and puts the value of this metric into the dynamic register 79 of the DTE 75. From then on, the static register 78 can only be updated by the component 71 itself (with the aid of the integrity metrics manager 77) whereas the dynamic register 79 can be updated (via the integrity metrics manager 77) both by the component 71 and the creating entity (assuming the latter has access to the policy 72 or has equivalent knowledge to be able to recognise a non-critical change).

The dynamic component 71 is entitled to measure and report changes to its structure. Thus when a change is determined (for example, by code set to detect any write operation to locations holding any part of the dynamic component), the dynamic component measures its effected part (that is, either its integrity-critical parts in the case of a critical change or the non integrity critical parts for non-critical changes. For a critical change, the resultant measurement is used to extend the value in the static register 79, effectively creating a permanent indication that a critical change has taken place; for a non-critical change, the new integrity measurement simply replaces the previous value held in the dynamic register 79.

Depending on the measurement values stored in both registers 78 and 79, the dynamic component 71 can be in one of three local integrity states:

If the values in the static and dynamic registers 78, 79 are consistent with the expected measurement values, the integrity is 'intact' (the component itself is trustable).

If the value in the static register 78 is consistent with the expected measurement value but the value in the dynamic register is not, the integrity is "recoverable".

In all other cases, the integrity is "irrecoverable".

Figure 8:
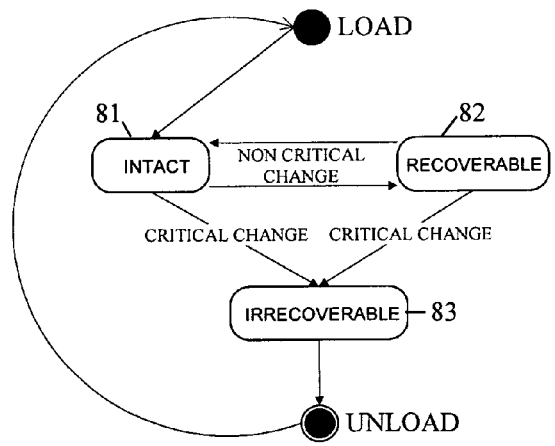
FIG. 8 is a state diagram of the dynamic component of FIG. 7.

The relations between these states is depicted in the state diagram of FIG. 8.

The foregoing arrangement enables a dynamic component that has only been subject to non-critical changes to be restored to its trustable condition and have this reflected in its integrity metric values stored in the registers 78 and 79. Also, a user may be willing to trust a dynamic component which according to the expected register values known to the DTE 75 is in its recoverable state because the dynamic register matches an expected value known to the user and not the DTE.

Hierarchy of Components

Figure 9:
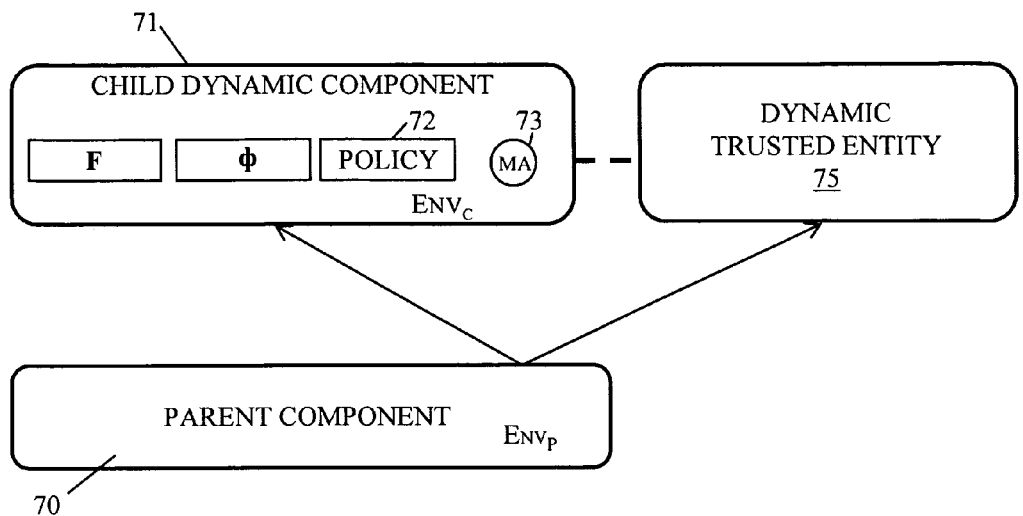
FIG. 9 is a diagram, similar to FIG. 7, but showing an hierarchical implementation of the first embodiment.

The concept of having a dynamic component 71 with an associated DTE 75 is particularly powerful in the context of a hierarchy of such components, each preferably in its own isolated environment (such as a hypervisor partition) and capable of creating child components. As is illustrated in FIG. 9, in this case, the dynamic component 71 launched by a parent component 70 advantageously comprises (in addition to policy 72 and measurement agent(s) 73):

1. A functionality group F that provides the necessary component functionality.
2. An execution environment $E_{NV}$ in which the functionality group executes.
3. A configuration group $\phi$ that defines the parameters for both 1) and 2).

Figure 10:
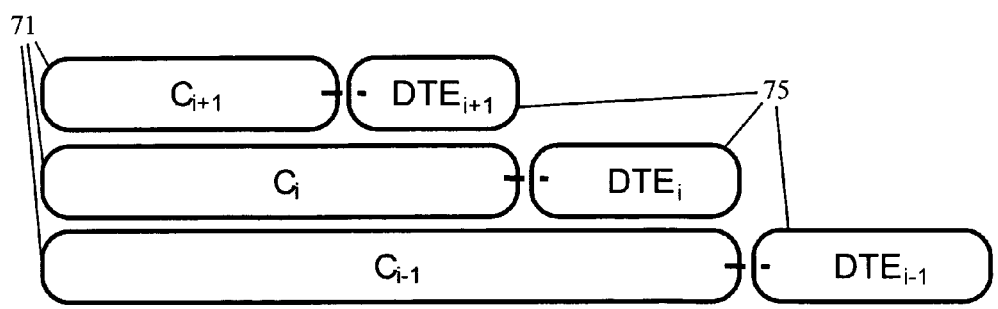
FIG. 10 is a diagram of a hierarchy of dynamic components and associated dynamic trusted entities of the FIG. 9 form.

FIG. 10 shows a hierarchical arrangement of three dynamic components 71 ($C_{i-1}$, $C_i$, $C_{i+1}$) each with its own dynamic trusted entity 75 ($DTE_{i-1}$, $DTE_i$, $DTE_{i+1}$). Each dynamic component Ci is created by its parent component Ci−1 along with the associated $DTE_i$. During creation, each DTEi is given a persistent identity that also denotes the component's location in the hierarchy. As illustrated in FIG. 10, the child component's execution environment $E_{NV_C}$ is a subset of the parent's execution environment $E_{NV_P}$. Thus, each component Ci can only have one immediate ancestor (i.e., parent). The resulting dependency relation can be represented with a component tree that is rooted in the root-of-trust of the trusted platform concerned.

This dependency tree can be used to enforce dynamic access control policies attached to secrets of a dynamic component. These policies determine under what conditions a component is allowed to access its secrets held in protected storage provided by the associated DTE. The policies are enforced by the DTE. For example, the access control policies may allow a dynamic component access to its secrets if and only if the integrity of the component and of its ancestors is intact (this requires the DTE to obtain the integrity states of the ancestor components by making appropriate requests to its parent component and to enable this to happen each DTE 75 preferably knows the parent 70 of its associated dynamic component 71).

Second Embodiment

A second embodiment of the invention will now be described with reference to FIG. 10. Like the hierarchical form of the first embodiment described with respect to FIG. 9, in the second embodiment dynamic components 71 are each associated with a respective dynamic trusted entity DTE. The dynamic components 71 are organised hierarchically. In FIG. 10, eight dynamic components 71 are shown, individually identified by the letters B to I, but only the DTE 75'E of the dynamic component 71E has been shown for reasons of clarity. The form of the DTE 75' differs from that described with respect to the first embodiment. In particular, in the second embodiment the static and dynamic registers associated with a dynamic component 71 are no longer provided as part of the corresponding DTE 75' but are disposed in protected storage 103 provided by a base component 102 that forms the root component A of the hierarchy 74B-74I; by way of example, FIG. 10 shows in protected storage 103 the static and dynamic registers 78E and 79E associated with the dynamic component 71E. The base component 102 also holds the expected measurement values for each descendent dynamic component.

The base component 102, like the dynamic components 71A-71I, preferably comprises a functionality group F, an execution environment E$_{NV}$, and a configuration group φ, and in addition to providing protected storage for use by the units 74, provides cryptographic resources that previously were to be found in the integrity metrics manager of each DTE 75. The manager 77' of each DTE of FIG. 10 now primarily serves as an interface to the base component 102. Dynamic components 71 use these interfaces to update their respective associated static and dynamic registers 78, 79 and to request access to other secrets stored in protected storage 103 on their behalf. The specifics of the access are controlled by a policy that is enforced by the base component 102.

In the present case, the base component 102 is part of the trusted computing base, TCB, 100 of the platform (the trusted computing base being the collection of entities, including the base component 102, that can potentially affect the trustworthiness of the platform). The trust chain of the platform extends from its roots of trust 101 (typically based on a hardware TPM) to the base component 102 and then on through the hierarchy of dynamic components, to the extent that their respective states justify this.

In this embodiment, the current TCG methods are used to carry out integrity measurements for the TCB 100 whereas the static and dynamic registers 78, 79 are used in the manner described with respect to the first embodiment to track, on a more fine-grained basis, the integrity of the dynamic components 71 outside the trusted computing base 100.

The base component 102 holds data detailing the structure of the tree of dependent components and the software to manage this tree. For simplicity, only a single base component 102 has been described, but the above-described arrangement can be generalized to multiple base components each with its own tree. Dynamic components 71 do not possess any information about the tree structure except the identity of their parent components (this information is held by the corresponding DTE).

As already indicated, knowledge of the tree's structure is used to enforce dynamic access control policies applying to the secrets of dynamic components. These policies determine under what conditions dynamic components are allowed to access their secrets. The policies are enforced by the base component 102. For example, integrity policies allow access to the secrets if and only if the integrity of the dynamic component and its ancestors is intact. This scheme results in a recursive integrity definition which is controlled by on-going measurements of each component image.

Security Services Management Framework (SSMF)

The above described architecture with a base component and dependent dynamic components is well suited to provide a security services management framework (SSMF) founded on the base component and manages the trust relations between security services provided (by dynamic components) to users.

For example, an important service offered by the SSMF is the management of security credentials that are used by the dynamic components to perform security-critical operations requested by users. A popular practice is to couple each credential with an access policy and allow its usage if an only if certain security properties are met. To this end, the SSMF can be arranged to employ integrity policies to provide guarantees to users that component credentials will be accessed only if the relevant integrity is intact. This way, users can verify the correct operation of the security services and the platform before exchanging data with it. The SSMF orchestrates this and similar trust relations between the security services and users and provides the necessary trusted interfaces. A fuller description of the framework architecture is given below.

Figure 11:
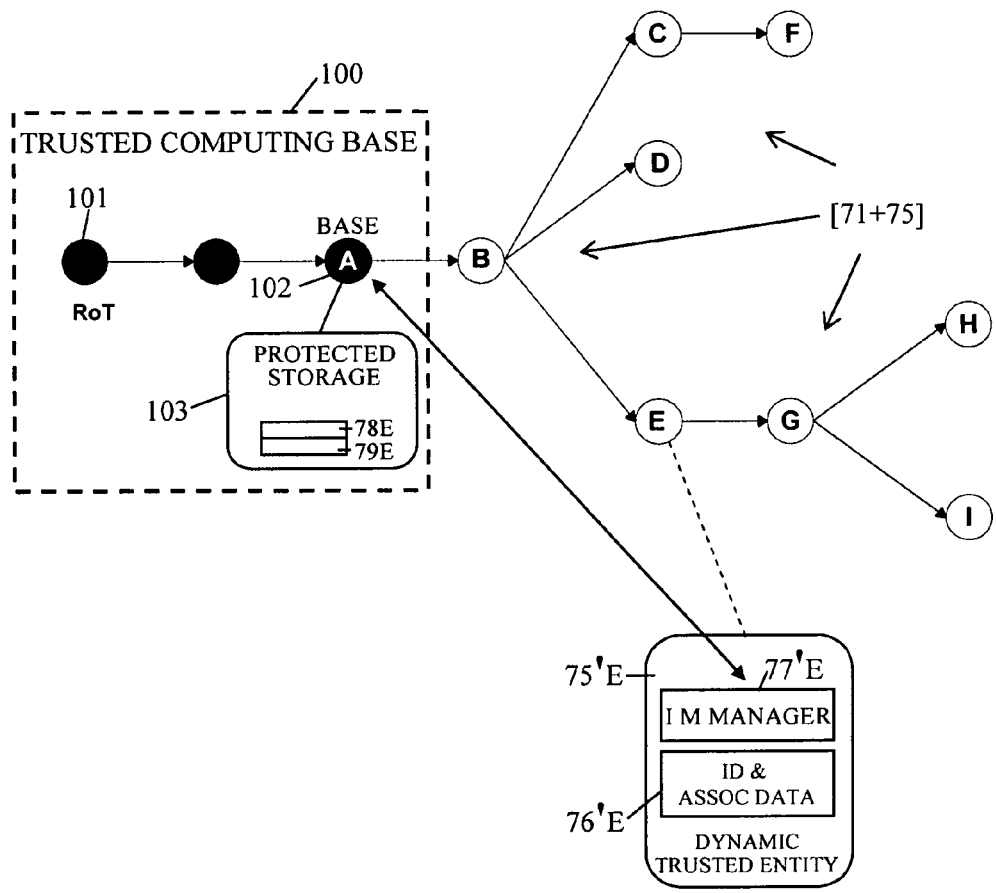
FIG. 11 is a diagram showing, for a second embodiment of the invention, a further hierarchy of dynamic components and their associated dynamic trusted entities, this hierarchy being rooted in a component of the trusted computing base of a trusted platform.
Figure 12:
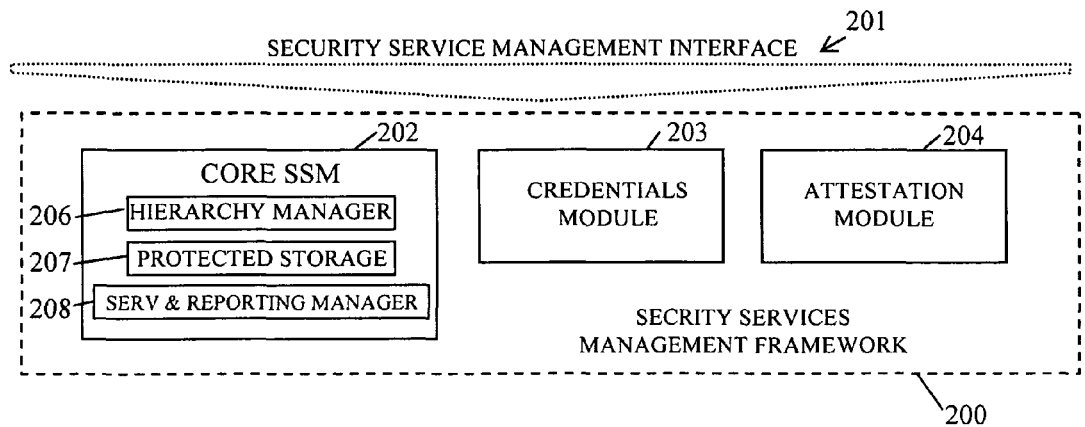
FIG. 12 is a diagram illustrating a security-services management framework based on the second embodiment.

As depicted in FIG. 12, the SSMF 200 is made up of a core security service management (SSM) module 202, a credentials module 203 and an attestation module 204 that for remote service-level attestation. The SSMF is accessed through a security services management interface (SSMI) 201 that is both used by the security services components (for life-cycle management, credential management, and integrity reporting) and users (for remote attestation). In particular, the SSMI 201 allows services to use the SSMF to:

Create dynamic child service components within the parent's execution environment and manage their life-cycle;
Store their security credentials in protected storage;
Access their security credentials inline with the integrity policies coupled with each;
Report ongoing dynamic and static changes to their structure and configuration;
Report their integrity status on service-level;

The core SSM module 202 serves as the base component of the component hierarchy (c.f. FIG. 11) and keeps track of the service (component) hierarchy and enables dynamic measurements. In particular, the main functions provided by the core SSM module 202 are (1) the holding of data detailing the structure of the service components that are managed by the SSMF, (2) the provision of protected storage for measurements and credentials, and (3) the provision of service and reporting interfaces for dynamic service creation and integrity measurement, respectively. Each of these functions is further described below:

Service Hierarchy Manager (block 206). As already mentioned, the security services are provided by dynamic components. Each dynamic component is, as previously described, associated with a dynamic trusted entity (DTE) that holds a persistent identity; for the purposes of the SSMF, this identity that also serves to identify the service component associated with the DTE. Therefore, to keep track of the service hierarchy, the core SSM module 202 simply manages a data structure whose nodes are composed of the DTE identities. The resulting data structure is a tree similar to the one illustrated in FIG. 11 in which each node is now a DTE representing the corresponding service component. These DTEs are the locators of service components in the service hierarchy and any operation on a service component is done through its corresponding DTE.

Protected Storage (block 207). The core SSM module 202 keeps track of both dynamic and static integrity measurements of the service components. Further, security credentials that are used by each service are handled and stored by the core SSM. Both types of information are sensitive data and the core SSM module 202 employs protected storage to store each piece of data for each component. The actual nature of this storage is implementation dependent. As an example, one can employ a trusted hardware module (TPM) to protect such information that is stored in ordinary storage as described above with reference to FIG. 5.

Service and Reporting Manager (block 208). The service and reporting manager provides services and reporting interfaces. The service interface offers a single create() command using which services can create child services along with their DTEs. Similarly, the reporting interface is composed of a single report() request that can be used to report both static and dynamic changes to the requesting services.

With regard to credential management provided by the credentials module 202, it will be appreciated that services may employ security credentials in variety of ways. For example, a credential can be a symmetric cryptographic key that a service uses to sign data. In this case, the ability to possess or have access to the security credential may give the service user sufficient proof that the service can be trusted. Access policies can be used to define the conditions under which the services are allowed to access these credentials. If the underlying platform that enforces these policies can be trusted, users can deduce that the service can access to the credential if and only if the policy conditions are satisfied.

The credentials module 202 provides verifiable means to securely store, manage, and provide usage access to security credentials and provides guarantees that the management and usage of these credentials will be performed by trusted entities that can be verified by third-party users. Integrity policies are used to determine whether a service can have access to its security credential or not. An integrity policy states that a service can access to its security credential if and only if the integrity of the service, its ancestors, plus the integrity of the platform (i.e., the trusted computing base, TCB) are all intact. As an example, in FIG. 11, the dynamic service component F can have access to its credential if and only if the integrity of F, C, B, and the TCB are intact. Note that, for example, the integrity of E has no effect on this particular decision.

Credential management involves two phases: registration and usage. The registration phase is a one time phase during which the credential is registered with the SSMF and sealed to the protected storage along with its access policy. To do so, a service component invokes a register() request of a credential interface of the credentials module 203; this initiates a registration request for the input credential preferably encrypted with an asymmetric key. Upon successful registration, the credentials module 203 returns a ticket that can be used later by the requesting service component to request usage access to the sealed credential. Preferably, this ticket is a blob, returned by the protected storage sealing service.

In the usage phase, the service component gains usage access to its security credential by supplying the ticket to the credentials module 203 via the credential interface. The credentials module 203 first locates the service in the service hierarchy using the service's persistent DTE identity. Access to the credential is granted if and only if the ticket is valid and the access policy holds for the current service and platform configuration (e.g., the integrity of the service, its ancestors, and the TCB is intact). Usage access to the credential should not reveal any information on the nature of the credential to the requesting service component; this is because if a service obtains the possession of its security credential, the SSMF loses the ability to revoke the credential should the dynamic service component reports a static or a dynamic change through the reporting interface. Therefore operations (encryption, decryption) requiring use of the credential are performed inside the SSMF (for example by the credentials module 203). Accordingly credential usage requests from a service component to the credential interface of the credential module 203 take the form of an encrypt() or decrypt() request.

With regard to the attestation module 204, this provides service-level attestation to third-party users that would like verify the integrity of the service before exchanging data with it. The attestation protocol employed is similar to that described in the TCG specifications. However, now, instead of running a full-scale platform attestation, the SSMF allows users to run a much finer-grained service integrity quote. This way, a user can request the cumulative integrity of any service component. The cumulative integrity of a service component is the combination of the local measurements of the service, its ancestors, and the underlying TCB.

Two example attestation protocols are described below, these protocols differing in respect of the entity (i.e., the user or the platform) employed to verify the integrity results Both protocols are initiated using the single attest() request (with the appropriate option) made to the attestation module.

First Example Attestation Protocol. In this case a third-party user acts as the verifier of the integrity of the service of interest (i.e., has access to the expected values for all relevant components of the platform and of the TCB). The following assumes that the component C of the FIG. 11 hierarchy is the component of interest.

1. The third-party user uses the attestation interface provided by the attestation module 204 to check the integrity of service component C and request signed copies of all related current integrity measurements.
2. The attestation module 204 locates C in the hierarchy using the identity of component C's DTE.
3. The attestation module 204 returns to the third-party user the integrity of C, B, and the TCB (i.e., the register values) plus a signature that is composed of signed copies of the integrity measurements of the components C, B and of the TCB, signed respectively by the attestation module 204 and by a platform trusted module TM:

$$\Sigma_A(\Sigma_A(I_C,I_B),\Sigma_{TM}(I_{TCB}))$$

where $\Sigma$ indicates signature by the suffixed entity and I indicates the integrity measurement made in respect of the suffixed element.

4. Upon receiving the measurements and verifying the signatures, the third-party user compares the current register values for the TCB and the components B, C with the expected ones and decides whether to trust C or not.

Second Example Attestation Protocol. In this case, the verifier is the platform and the third-party user either receives a trusted answer with a proof or a single not-trusted answer. The first two steps of the protocol are the same as above. In the third step, instead of returning the integrity measurements, the framework compares the current and the expected values. For example, for service component C, it returns a trusted answer after comparing the static and dynamic measurements of both C and B to the expected values. Along with the answer, the framework returns the integrity of the TCB and the signature $\Sigma_{TM}(I_{TCB})$ as the proof. This is because, for this example, the third-party user still needs to verify that the answer is generated by a trusted platform.

It will be appreciated that the described embodiments of the invention enables dynamic components to re-establish trust without requiring a complete restart under certain conditions. This is particularly advantageous for systems with components that change frequently and operate in various security modes. On-going monitoring and reporting allow components to reflect the latest system state. This provides up-to-date information about the system in contrast to current implementations that measure the components once during booting.

Furthermore, because integrity measurements are stored in software registers, the described embodiments are more scalable than current arrangements that require hardware registers to store the complete set of integrity measurements.

The described hierarchical integrity management scheme (i.e., tree-of-trust) is more suitable for complex systems than current solutions that offer linear models (i.e., chain-of-trust). If the necessary isolation properties are guaranteed, the hierarchical approach provides a finer-grained integrity management solution that allows:

Better representation: The hierarchical approach enables components with no dependency relation to each other to build separate integrity chains. Thus, the integrity of a component only involves the integrity of itself plus its ancestors.

Isolation: Changes to components are isolated only to the appropriate branch of the integrity chain, thus do not affect the complete platform. As a result, a critical change will no longer require restarting and re-measuring the complete platform but only the appropriate branch.

It will be appreciated that many variants are possible to the above described embodiments of the invention. In particular, the skilled person will appreciate that the present invention does not rely for its operation on use of a trusted platform technology of the particular form described above with reference to FIGS. 1 to 6 or as described in the TCG Specifications.

Different change classifications may be used to those described above.

It is to be noted that a component is any platform entity that can change the trust state of a platform through execution. There are no restrictions on the specifics of a platform component. As an example, a component can be a service residing in a virtual domain (partition); alternatively, a component can be the virtual domain itself. Hence, the exact granularity in defining platform components depends on the granularity of integrity management we require on the platform.

Advantageously different granularities of integrity management can be used together. For example, two levels of trust management with different component granularity can be employed on the same platform. Thus the above-described SSMF can be applied both:

in a local context, in which a local SSMF is used to manage the security services that reside in a single virtual machine (established in its own virtual domain or partition)—in the case of multiple virtual domains, each domain contains a local SSMF implementation that works independently of local SSMFs in other domains);

in the global context, in which a global SSMF is used to manage a hierarchy of virtual machines each in its own virtual domain. Note that in this case the dependency between virtual machines is not an implicit one but is stated explicitly (i.e., there is no implicit ancestry relation between VMs due to execution order). For example, if one of the virtual machines serves as a management machine that is responsible for managing the rest of the virtual machines, there is an explicit dependency in which the management virtual machine assumes the role of the parent for the remaining child virtual machines. setting.

Figure 13:
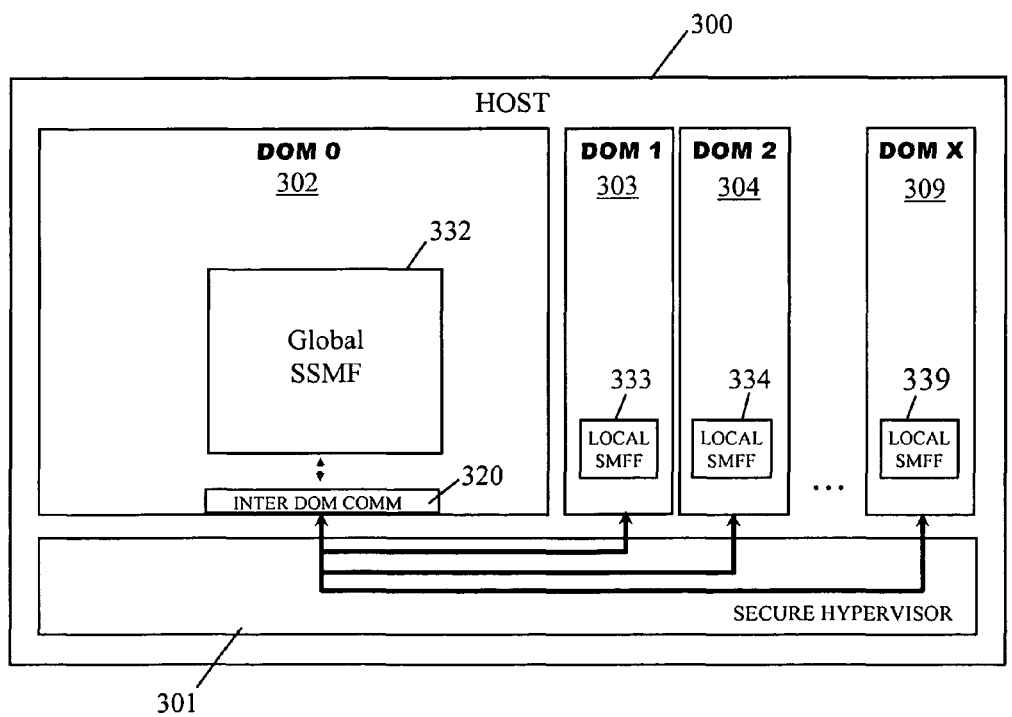
FIG. 13 is a diagram illustrating a host platform with multiple virtual domains and provided both with a global security-services management framework and with domain-specific local security-services management frameworks.

FIG. 13 illustrates the combined use of global and local SSMFs for a host 300 running a secure hypervisor 301 to provide multiple virtual domains (named "Dom 0" to "Dom X") 302-309. A global SSMF 332 runs as a trusted application in Dom0 and serves to manage a hierarchy of virtual machines each in its own virtual domain. Communication between the global SSMF 332 and the virtual machines that it manages is through an inter-domain communication arrangement 320. Each of the domains 303 to 309 has its own local SSMF 333 to 339 respectively.

The invention claimed is:

1. A method of tracking the state of a software component in use on a computing platform, the method comprising:
    upon a change of a first type in the software component, measuring and recording an integrity metric of the software component corresponding to the first type in cumulative combination with any previous integrity metric values recorded for changes of said first type to the software component; and
    upon a change of a second type in the software component, measuring and recording an integrity metric of the software component corresponding to the second type as a replacement for any previous integrity metric value recorded for changes of said second type to the software component.

2. A method according to claim 1, wherein
    a change of said first type is one made to an integrity critical part of the software component, wherein the integrity critical part of the software component comprises code or other data of the software component that has a potential impact on the ability of the software component to implement an intended functionality of the software component; and
    a change of said second type is one made to a non integrity-critical part of the software component, wherein the non integrity-critical part of the software component comprises code or other data of the software component that has substantially no impact on the software component's ability to implement an intended functionality of the software component.

3. A method according to claim 2, wherein
the integrity metric measured as a result of a change of said first type is measured over at least the integrity critical part of the software component; and
the integrity metric measured as a result of change of said second type is measured over at least the non integrity-critical part of the software component.

4. A method according to claim 1, wherein the software component comprises:
a functionality group that provides component functionality; and
an execution environment in which the functionality group executes.

5. A method according to claim 1, wherein the integrity metric measured as a result of a change of said first type is recorded to a first register and the integrity metric measured as a result of change of said second type is recorded to a second register, the first and second registers being logically part of a trusted entity associated with the software component.

6. A method according to claim 5, applied to each of a plurality of software components arranged in a hierarchy, wherein each child software component in the hierarchy operates in an execution environment of a parent software component in the hierarchy, the state of each software component of the hierarchy being separately tracked with each software component having a respective associated pair of first and second registers.

7. A method according to claim 6, wherein the platform provides a trusted base component common to all said software components, the pair of first and second registers associated with each software component being maintained by the trusted base component.

8. A method according to claim 7, wherein the base component forms a root of said hierarchy.

9. A method according to claim 8, wherein the base component provides an execution environment for said hierarchy.

10. A method according claim 7, wherein the base component is part of a trusted computing base of the platform.

11. A method according to claim 1, further comprising preventing use of confidential data associated with said software component unless:
a cumulative value arising from integrity metrics recorded for changes of said first type, and the integrity metric value last recorded for changes of said second type, both match respective expected values.

12. A method according to claim 1, applied to each of a plurality of software components arranged in a hierarchy rooted in a trusted base component of the platform; wherein the integrity metrics measured as a result of changes of said first and second types are stored in secure locations maintained by the trusted base component; the method further comprising preventing use of confidential data associated with one of said software components unless the integrity metrics of that software component and ancestors of that software component in said hierarchy, all match respective expected values.

13. A method according to claim 1, wherein the software component is a domain established by a hypervisor executing on the platform.

14. A method according to claim 1, wherein the software component is a component running in domain established by a hypervisor executing on the platform.

15. A computing platform including a monitoring arrangement for tracking the state of a software component in use on the computing platform, the monitoring arrangement comprising:
change responsive means for detecting and distinguishing first and second types of changes to the software component;
first and second memory registers;
first measuring means responsive to detection of a change of the first type in the software component, to measure an integrity metric of the software component corresponding to the first type;
first recording means for recording the integrity metric measured by the first measuring means in the first register in cumulative combination with any previous integrity metric values recorded in the first register for changes of said first type to the software component;
second measuring means responsive to detection of a change of the second type in the software component, to measure an integrity metric of the software component corresponding to the second type;
second recording means for recording the integrity metric measured by the second measuring means in the second register as a replacement for any previous integrity metric values recorded in the second register for changes of said second type to the software component.

16. A computing platform according to claim 15, wherein:
a change of said first type is one made to an integrity critical part of the software component, wherein the integrity critical part of the software component comprises code or other data of the software component that has a potential impact on the ability of the software component to implement an intended functionality of the software component; and
a change of said second type is one made to a non integrity-critical part of the software component, wherein the non integrity-critical part of the software component comprises code or other data of the software component that has substantially no impact on the software component's ability to implement an intended functionality of the software component.

17. A computing platform according to claim 16, wherein
the integrity metric measured as a result of a change of said first type is measured over at least the integrity critical part of the software component; and
the integrity metric measured as a result of change of said second type is measured over at least the non integrity-critical part of the software component.

18. A computing platform according to claim 15, wherein the software component comprises:
a functionality group that provides component functionality; and
an execution environment in which the functionality group executes.

19. A computing platform according to claims 15, wherein the first and second registers are logically part of a trusted entity associated with the software component.

20. A computing platform according to claim 19, including a plurality of software components arranged in a hierarchy, wherein each child software component in the hierarchy operates in an execution environment of a parent software component in the hierarchy, the state of each software component of the hierarchy being separately tracked with each software component having respective associated first and second registers and respective first and second measuring and recording means.

21. A computing platform according to claim 20, wherein the platform further includes a trusted base component common to all said software components, the pair of first and second registers associated with each software component being maintained by the trusted base component.

22. A computing platform according to claim 20, wherein the base component forms a root of said hierarchy.

23. A computing platform according to claim 22, wherein the base component provides an execution environment for said hierarchy.

24. A computing platform according to claim 19, wherein the base component is part of a trusted computing base of the platform.

25. A computing platform according to 15, further including an access control arrangement for preventing use of confidential data associated with said software component unless:

a cumulative value arising from integrity metrics recorded for changes of said first type, and the integrity metric value last recorded for changes of said second type, both match respective expected values.

26. A computing platform according to claim 15, including a plurality of software components arranged in a hierarchy rooted in a trusted base component of the platform; each software component having respective first and second registers and respective first and second measuring means; the first and second registers comprising secure locations maintained by the trusted base component; and the computing platform further including an access control arrangement for preventing use of confidential data associated with said software component unless the integrity metrics of that software component and ancestors of that software component in said hierarchy, all match respective expected values.

* * * * *

UNITED STATES PATENT AND TRADEMARK OFFICE
CERTIFICATE OF CORRECTION

| | |
|---|---|
| PATENT NO. | : 8,060,934 B2 |
| APPLICATION NO. | : 12/059387 |
| DATED | : November 15, 2011 |
| INVENTOR(S) | : Serdar Cabuk et al. |

It is certified that error appears in the above-identified patent and that said Letters Patent is hereby corrected as shown below:

In column 21, line 42, in Claim 10, after "according" insert -- to --.

In column 22, line 56, in Claim 19, delete "claims" and insert -- claim --, therefor.

In column 23, line 14, in Claim 25, before "15" insert -- claim --.

Signed and Sealed this
Twenty-eighth Day of August, 2012

David J. Kappos
*Director of the United States Patent and Trademark Office*